United States Patent [19]

Bush

[11] Patent Number: 5,264,175

[45] Date of Patent: Nov. 23, 1993

[54] METHOD FOR MAKING THREE DIMENSIONAL IMPRESSIONS

[76] Inventor: Byron V. Bush, 353 Wimpole Dr., Nashville, Tenn. 37211

[21] Appl. No.: 744,420

[22] Filed: Aug. 12, 1991

[51] Int. Cl.$^5$ .......................... B28B 1/00; B29C 39/02
[52] U.S. Cl. .................................. 264/222; 264/225; 264/227; 264/DIG. 30
[58] Field of Search ................ 264/219, 222, DIG. 30, 264/220, 225, 221, 227; 428/15, 16; 156/57, 58, 59, 61

[56] References Cited

U.S. PATENT DOCUMENTS

| | | | |
|---|---|---|---|
| 223,603 | 1/1880 | Neubert | 264/225 |
| 339,334 | 4/1886 | Searle | 264/222 |
| 803,004 | 10/1905 | Mayer | 264/222 |
| 996,783 | 7/1911 | Moreau | 264/222 |
| 1,613,989 | 9/1927 | Fuller | 264/221 |
| 1,675,202 | 6/1928 | Warne | 264/257 |
| 3,197,534 | 7/1965 | Murray | 264/221 |
| 3,537,930 | 11/1970 | Anderson | 156/59 |
| 3,626,954 | 12/1971 | Ostrom | 264/222 |
| 3,917,786 | 11/1975 | Weigert | 264/227 |
| 4,397,701 | 8/1983 | Johnson et al. | 264/222 |
| 4,749,431 | 6/1988 | Fässle et al. | 156/245 |

FOREIGN PATENT DOCUMENTS 287044 8/1928 United Kingdom .

Primary Examiner—Jay H. Woo
Assistant Examiner—Duane S. Smith
Attorney, Agent, or Firm—I. C. Waddey, Jr.

[57] ABSTRACT

My invention relates to the art of making three dimensional impressions and likenesses. More specifically, my invention is an improvement of making three dimensional duplicate of a persons facial appearance and expression. The steps of my method include the formation of a mold by applying a base impression material such as irreversible hydrocolloid to the face of the model; base material being applied in a semi-liquid state and hardening to a gel-like consistency in a short period of time; applying fibrous bonding patches in the liquified base material shortly after the base material is placed on the model and prior to setup; applying plaster of paris strips to the base material, the plaster of paris strips connecting to the mold created by the base material by the fibrous bonding patches which have embedded themselves in the base material and which will likewise embedd themselves in the plaster of paris; allowing the plaster of paris strips to harden; removing the mold from the model's face; and finally filling the mold with a material such as gypsum stone, which is poured into the mold in a liquified form and which will harden in a short period of time to form a permanent duplicate of the model's face and expression.

3 Claims, No Drawings

METHOD FOR MAKING THREE DIMENSIONAL IMPRESSIONS

BACKGROUND OF THE INVENTION

My invention is an improvement in the art, heretofore attempted in a variety of ways of making an exact duplicate of a person's facial appearance. Obviously, artists have sculptured duplicates of the facial expression of their models since the beginning of recorded history. However, such sculptured duplicates require a tremendous amount of talent, skill, and patience. It is certainly an art which can not be practiced by the novice, and if a person desires to have a three-dimensional reproduction of his facial appearance and expression created, it would, in all likelihood, be an expensive undertaking to hire an artist to create such a work of art. With these factors in mind, several attempts have been made to invent a method to mechanically produce a three dimensional duplicate of the facial expression of a model. For a variety of reasons, these efforts have proven to be unsuccessful or deficient in one way or another. The present invention attempts to overcome the deficiencies of the prior art. The present invention involves a uniquely simple method of creating the duplicate, a method that is easy to use, simple to implement, safe to both the model and the person implementing the method through the steps of the method as disclosed herein, an inexpensive process, and one which will avoid distortion of the mold and thereby help to insure that one will produce an exact three dimensional duplicate of the facial appearance and expression of the model.

The prior art has made a number of attempts at this process, and the present invention is an improvement over these prior efforts. The prior art that is most closely related to the present invention is that disclosed in U.S. Pat. No. 803,004 to issued on Oct. 31, 1905, and the British Patent No. 287,044 issued on Aug. 16, 1928, to Camnasio. Both Mayer and Camnasio disclose the concept of making a cast of the face by the application of a layer of moldable or malleable material onto the face of the model and then applying a second coating of plaster of paris or the like to reinforce the mask. Camnasio discloses the application of pieces of gauze to the liquified mold material to provide reinforcement and support for the negative, to facilitate it detachment and to keep it in shape (see column 2, lines 55–59). A particular drawback of the inventions as disclosed by these two prior disclosures is that once the pliable material is painted onto the face of the subject, and thereafter a plaster of paris type of material or some other stabling material is placed over the pliable material, it is very difficult to create a proper adherence between the pliable material and the plaster of paris or other stabilizing material.

Experience has shown that when the processes of the teachings of Mayer and Camnasio are employed, there is a likelihood the pliable material will separate from the stabilizing material and a great tendency for the mold to distort as it is removed from the model's face. Because of a lack of proper adherence between the pliable material and the plaster of paris material that is used to support the mold, as the mold is removed from the model's face, the pliable material tends to stick to the model's face and pull away from the plaster of paris material. When this happens, the mold itself is distorted so that when the duplicate is formed, it is not an exact reproduction of the model's face.

The present invention is a simple improvement in the known processes, one that is neither obvious or apparent from the prior art. The present invention interjects an intermediate step in the heretofore known processes by applying bonding patches to the pliable material after the pliable material is placed on the model's face and while the pliable material is still in a semi-liquid state. These bonding patches adhere to the pliable material and the pliable material will in fact penetrate the fibers of the bonding patch and as the pliable material dries, the bonding patch will become a part of the pliable material. At the next step of the process, when the plaster of paris is applied over the pliable material, the plaster of paris will impregnate the fibers of the bonding patch and become fixedly adhered to the bonding patch. Thus, a direct adherence between the plaster of paris and the pliable material is created, a unique and significant improvement in the processes heretofore known from the prior art. By creating this direct bond between the pliable material and the plaster of paris, one using this inventions can remove the mold from the face of the model without the pliable material becoming distorted because of the tendency of the pliable material to stick to the face of the model and pull away from the support part of the mold created by the plaster of paris.

Considering this brief description of the background of the invention and the prior art, the present invention can be summarized as a method of forming a three dimensional duplicate of the facial appearance and expression of a model by applying a base material to the face of the model, the base material being in a semi-liquid state when applied and yet hardening quickly after its application, applying bonding patches to the base material so that the base material permeates the fibers of the bonding patch to cause an adherence between the bonding patch and the base material, applying plaster of paris strips over the base material with the bonding patches adhered thereto with the plaster of paris material penetrating the bonding patches to create an adherence between the plaster of paris material and the base material so that the plaster of paris material, when hardened, will create a solid support for the mold and the bonding patches will cause the mold created by the base material to remove cleanly from the face of the model. Thus, the mold itself will not be distorted in the removal process.

Because of the unique aspects of making a duplicate of a person's facial appearance and expression, certain precautions must be taken. Obviously, in making the mold, care must be taken not to cover both the mouth and the nose of the model, otherwise, the model would suffocate during the procedure. Likewise, the substance used to make the mold must be non-toxic to avoid injury in the event of ingestion, inhalation, or the obvious contact with the skin in the course of making the mold. The mold, which is formed by placing the substance in contact with the face must be made from a very pliable and liquid type material and removing the mold once it is formed must be done in such a way as to avoid distortion. The present invention is directed specifically at the latter problem and is an object of the present invention to provide a method for construction of an exact three dimensional duplicate of a person's facial appearance and expression without distortion.

It is another object of the present invention to provide a method for forming such a duplicate through the use of a mold procedure which can be employed simply, quickly, and without any injury to the model.

It is a further object of the present invention to provide a method that would allow the process to be used by a layman and which would not require the skills and technical knowledge of an expert in the art of the formation of molds.

Your applicant does not feel that it is necessary to provide drawings to illustrate the steps of the method, but feels that they can be adequately described without the necessity of illustration through drawings. Applicant does however, provide the following detailed description of the preferred embodiment of the invention.

The present invention involves a method of making an exact three dimensional duplicate of the facial appearance and expression of a model. In order to create this three dimensional duplicate, one must first construct a mold using the steps hereinafter described in detail. Once the mold is constructed, the mold is filled with a casting material which is poured into the mold in liquid form and is allowed to harden. Once set, the casting material is removed from the mold to create the three dimensional duplicate.

The mold is formed by coating the face of the model with a base material such as irreversible hydrocolloid or the like. The base material is applied in a thickness of approximately three to four millimeters. The base material is applied in a semi-liquid form, preferably by starting at the nose and mouth area of the model and spreading the base material over the face of the model with a spatula or with the fingers of the artist. Care must be taken not to close off the nostrils and mouth of the model and prior to initiating the process, a decision must be made on whether to allow the model to breathe through the mouth or through the nose or in the case of one deceased, both may be covered with no ill effects. After that decision is made, either the nostrils are allowed to remain uncovered by the base material or, alternatively, the mouth is left uncovered by the base material. Generally, a better mold is formed covering the mouth and allowing the base material to be applied around the nose but not cover the nostrils of the model. This will allow the model to breathe through his or her nose during the entire procedure. The model should have his or her eyes gently closed during the procedure so that the base material will not get into the eyes.

The base material is applied over the entire face of the model. Because the base material begins to harden reasonably quickly, the person applying the base material must do so rather expediently in order to cover the entire face before the base material hardens. The person applying the base material should move rapidly from the nose outwardly to cover all of the crevices and undulations of the model's face. Effort should be made to brush the base material into small crevices around the model's mouth, nose and eyes so as to get an exact detail of the model's facial appearance and expression.

Once the base material has been applied to the model's face, bonding patches of a fibrous cloth like material are pressed onto the base material with sufficient pressure to cause the bonding patches to be embedded into the base material. Thus, the base material will permeate the fibers of the bonding patches and create a strict adherence between the bonding patches and the base material. A number of bonding patches should be used spread over the entire face of the model so that the bonding patches will cover a substantial portion of the model's face. After the base material begins to harden, plaster of paris strips are applied over the base material with the bonding patches embedded therein as the base material continues to rest on the face of the model. Plaster of paris strips are a readily available commercial item. They are employed by dipping them into a bowl of water which activates the hardening elements of the plaster of paris material in a relatively short period of time. In this particular procedure, the plaster of paris strips of approximately inches in length are dipped into water and then placed over the model's face with the base material stationed thereon. The strips are applied in such a fashion as to leave open the openings in the base material established to allow the model to breathe. Thus, the plaster of paris strips will leave an opening either about the mouth or about the nostrils of the model. In any event, the plaster of paris strips are applied lightly but with enough pressure to cause them to conform to the face of the model as covered by the base material. They are also applied with such pressure as to allow the plaster of paris material to permeate the fibers of the bonding patches so that a strict adherence between the bonding patches and the plaster of paris material will occur as the plaster of paris strips harden. Once the plaster of paris strips have been applied and the entire face of the model is covered with the plaster of paris strips, they are allowed to harden which creates a rigid cast mold and which provides support for the exact mold duplicate of the model's face which is created by the base material. The bonding patches which are adhered to both the base material and the plaster of paris strips causes the base material to remove readily from the model's face when the mold is removed.

Care must be taken in removing the mold so that the base material is not distorted around the edges but is removed to maintain its original form. In removing the mold, the fingers of the artisan should be used to gently feather the base material from the model's face around the perimeter of the mold until it has been loosely detached from the model's face. The mold is then held with both hands and gently agitated to remove the mold from the model's face, causing the base material to disengage from any adherence to the model's face and to remain adhered to the plaster of paris support portion of the mold because of the bonding patches inserted between the base material and the plaster of paris strips.

Once the mold is removed from the model's face, it is placed on a working surface with the negative portion of the mold positioned upwardly. The mold should be supported by a towel or other support item wrapped around the base of the mold so as to keep it from tipping over once the impression material is poured into the mold.

The next step of the process is to pour into the mold a casting material such as gypsum stone or the like. The casting material is filled into the mold in a liquid state, and it hardens quickly to form an exact duplicate of the facial appearance and expression of the model. Prior to filling the mold, one would seal the openings left either at the nostril area or the mouth area of the model so as to keep the impression material from filtering through those openings. Once the impression material has hardened, the mold and the impression material are separated and an exact three dimensional duplication of the model's face will have been created.

Having described the preferred embodiment of my invention, it will be readily apparent that those who are readily skilled in the art that the invention could be used as a method for creating an exact duplicate of other three dimensional items.

Having described my invention in detail, I claim:

1. A method of making a three dimensional impression of an object including the following steps:
    A) forming a mold by:
        a) applying a base material such as irreversible hydrocolloid to the object, the base material being one that can be applied in a semi-liquid state and one which will harden to a gel like consistency in a short period of time;
        b) applying bonding patches of fibrous material to the base material while the base material is in its semiliquid state;
        c) applying plaster of paris strips to the base material, the plaster of paris strips being wetted to activate the hardening component of the strips so that the plaster of paris strips will form a support portion of the mold and bond to the base material by impregnating the fibrous material of the patches so that the fibers of the patches become embedded in both the base material and the plaster of paris strips;
        d) allowing the plaster of paris strips to harden.
    B) removing the mold from the object;
    C) filling the mold with a casting material such as gypsum stone which is poured into the mold in a liquified form and which will harden in a short period of time to form a permanent duplicate of the object;
    D) allowing the casting material to harden, and;
    E) separating the mold from the hardened casting material.

2. The method described in claim 1 wherein the object is the face of a human model.

3. The method described in claim 2 wherein openings are created in the base material and plaster of paris at either the nostrils or the mouth of the model to allow the model to breathe during the process, and wherein the openings so formed in the mold are covered during the process of filing the mold with the impression material.

* * * * *